United States Patent [19]

Wilson et al.

[11] Patent Number: 4,542,654
[45] Date of Patent: Sep. 24, 1985

[54] BOURDON TUBE CONSTRUCTION

[75] Inventors: Harold W. Wilson; Richard H. Wetterhorn, both of Fairfield, Conn.

[73] Assignee: Dresser Industries, Inc., Dallas, Tex.

[21] Appl. No.: 442,533

[22] Filed: Nov. 18, 1982

[51] Int. Cl.⁴ .................................. G01L 7/04
[52] U.S. Cl. ........................ 73/741; 73/732
[58] Field of Search .............. 73/741, 732, 733, 734, 73/735, 736, 737, 738, 739, 740

[56] References Cited

U.S. PATENT DOCUMENTS

| 18,129 | 9/1857 | Ashcroft | 73/741 |
| 2,116,628 | 5/1938 | Heise | 73/741 |
| 2,712,240 | 7/1955 | Booth | 73/741 |
| 2,780,111 | 2/1957 | Soete | 73/741 |
| 3,398,584 | 8/1968 | Heise | 73/741 |
| 4,240,298 | 12/1980 | Wetterhorn | 73/732 |

OTHER PUBLICATIONS

Dresser Industries, Inc., Industrial Valve & Instrument Division Drawing Nos. 142B119, 142B160.

Primary Examiner—Donald O. Woodiel
Attorney, Agent, or Firm—Daniel Rubin

[57] ABSTRACT

A Bourdon tube and its method of manufacture comprised of a displaceable portion having an arcuate extent of between 170 degrees and 190 degrees, with a controlled size opening contained in the edge face of each end. Secured pressure tight in one end opening is a capillary forming the non-displacement portion of the Bourdon tube, while secured pressure tight in the other end is a seal plug forming the tube tip of the Bourdon tube.

4 Claims, 11 Drawing Figures arrangements of FIG. 6. With capillary 30 and plug 32 installed within openings 38 and 40, the joints thereat are sealed in a pressure tight relation by soldering, brazing, welding, bonding, etc. Thereafter, the lower end of tube 30 is bent as shown in phantom in FIG. 2 to conform with the assembled configuration illustrated in FIG. 1. When the preferred arcuate extent of substantially 180 degrees is maintained for displacement portion 28, a symmetrical construction is afforded with parallel axes of openings 30 and 40, as to greatly simplify production fabrication of the assembly which follows.

The operative effect of the shortened construction hereof as compared to the prior art can be understood with reference to FIG. 7. As there shown, the initial direction of tube end motion for varying arcuate extents $\beta$ of displacement portion 28 are represented by arrows 42 shown extending in a direction normal to an imaginary line 44 extending in phantom from the polar point 48 for a particular tube arc of interest, to the tube end 18. Point 48 is located on a radial line 46 corresponding to an angle $\alpha$ equal to one-half angle $\beta$. As can be understood from the diagram of FIG. 7, the lesser the arcuate extent of displacement portion 28 the greater the span distance A between the polar point 48 and the point of motion utilization, resulting in increased magnification effect at the free end 18.

By the above description there is disclosed a novel Bourdon tube and method of construction therefor that for any given operating range results in a significant reduction in material consumption as compared to similar purpose constructions of the prior art, while maintaining operational performance of the tube. By a simple, yet effective, construction in accordance with the invention the manufacturer is afforded a significant advantage in effecting a cost reduction for the pressure instrument in which such Bourdon tubes are to be utilized.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A Bourdon tube comprising in combination:
   (a) a duct-like displacement portion of non-circular section substantially throughout its length and having an arcuate extent of substantially about 180 degrees and terminating at opposite ends with end faces in a substantially coplanar relation;
   (b) said displacement portion including an opening defined in each end face with each of said openings being dimensionally smaller than the corresponding end face dimension of the end face in which the respective openings are contained;
   (c) a relatively non-displacement elongated duct-like portion of substantially circular section having a first end secured in pressure tight relation communicating inward of one end opening of said displacement portion and having a second end adapted for connection to a pressure instrument with which it is to be utilized; and
   (d) a plug secured in a pressure tight seal to the other end opening of said displacement portion.

2. A method of constructing a Bourdon tube comprising the steps of:
   (a) forming a duct-like displaceable portion into a non-circular section substantially throughout its length and having an arcuate extent of substantially about 180 degrees and terminating at opposite ends with end faces in a substantially coplanar relation and with an opening in each of said end faces dimensionally smaller than the corresponding end face dimension thereat;
   (b) securing a first end of a relatively non-displaceable elongated tube of circular section in a pressure tight relation communicating inward of one end opening of said displaceable portion; and
   (c) securing a plug in a pressure tight seal to the other end opening of said displaceable portion.

3. In a pressure gauge comprising a casing, a socket extending outward of said casing for connecting to a source of pressure to be gauged, a Bourdon tube extending from a fixed end in fluid communication with said socket to a free end displaceable in correlation to the values of pressures received at said socket and a movement for operably transmitting pressurized displacement of said Bourdon tube to an output pointer shaft supported for rotation, said Bourdon tube comprising in combination:
   (a) a duct-like displacement portion of non-circular section substantially throughout its length and having an arcuate extent of substantially about 180 degrees and terminating at opposite ends with end faces in a substantially coplanar relation;
   (b) said displacement portion including an opening defined in each end face with each of said openings being dimensionally smaller than the corresponding end face dimension of the end face in which the respective openings are contained;
   (c) a plug secured in a pressure tight seal to the opening at the free end of said displacement portion; and
   (d) a relatively non-displacement elongated duct-like portion of substantially circular section having a first end secured in pressure tight relation communicating inward with the opening at the other end of said displacement portion and having a second end connected to said socket.

4. In the method of constructing a pressure gauge, including a casing, a socket extending outward of said casing for connecting to a source of pressure to be gauged, a Bourdon tube extending from a fixed end in fluid communication with said socket to a free end displaceable in correlation to the values of pressure received at said socket and a movement for operably connecting the free end of said Bourdon tube with an output pointer shaft supported for rotation, constructing said Bourdon tube by the steps of:
   (a) forming a duct-like displaceable portion into a non-circular section substantially throughout its length and having an arcuate extent of substantially 180 degrees and terminating at opposite ends with end faces in a substantially coplanar relation and with an opening in each of said end faces dimensionally smaller than the corresponding end face dimension thereat;
   (b) securing a plug in a pressure tight seal to the opening in the free end of said displaceable portion; and
   (c) securing the unfixed end of a relatively non-displaceable elongated tube of circular section to be secured at its other end fixed to said socket in a pressure tight relation communicating inward with the other end opening of said displaceable portion.

* * * * *

BOURDON TUBE CONSTRUCTION

TECHNICAL FIELD

The field of art to which the invention pertains comprises the art of measuring and testing as related to pressure actuated instruments.

BACKGROUND OF THE INVENTION

Pressure gauges and other instruments utilizing a Bourdon tube enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product.

Commonly affording pressure sensitivity in the pressure gauge is the Bourdon tube being a tube of a pressure tight construction having a free end displaceably movable in a well known and predictable manner in response to pressure changes supplied at its inlet. To translate tube movement into values of pressure, a pointer opposite a calibrated dial plate is displaceably driven by the free end of the tube, usually through an amplification device.

Typically, Bourdon tubes of the prior art are formed by shaping stainless or process tubing as a unitary structure comprised of an arcuate displacement portion communicating at one end with a relatively non-displacement portion and terminating at its free end in what is regarded as the displacement tip. The arcuate extent of such displacement portions is characteristically on the order of about 230 degrees to 270 degrees.

While such Bourdon tubes of the prior art have provided reliable and satisfactory performance over the years, it has been realized that the quantity of metal consumed in the manufacture of such tubes for any given operating range can be excessive in that the displacement portions have greater arcuate extent than required to meet performance requirements. Obviously, the use of excess material constitutes waste which in turn translates into added and unnecessary expense for the manufacturer. This problem is further compounded when severe service conditions are encountered requiring the use of more exotic and more costly materials in the manufacture of such tubes. Despite recognition of the foregoing, a ready solution to the problem has not heretofore been known.

SUMMARY OF THE INVENTION

The invention relates to Bourdon tubes and more specifically to a less costly construction and improved method of constructing Bourdon tubes than previously utilized in the prior art. This is achieved in accordance with the invention by constructing the Bourdon tube from components rather than from a unitary structure in the manner of the prior art. Unlike the prior art in which the displacement portion conventionally extends between about 230 to 270 degrees, the displacement portion hereof is substantially of semi-circular configuration having an arcuate extent of between about 170 degrees to 190 degrees. Angles below 170 degrees tend toward marginal performance while angles above 190 degrees tend toward material excess. An arcuate extent approaching 180 degrees is preferred.

To complete assembly, a controlled size opening is afforded in the edge face at each end of the arcuate semi-circle, one of which receives the non-displacement capillary for pressure tight joinder thereat, while the other receives a plug for pressure tight joinder thereat to define the displacement tip of the tube. After securing the capillary and plug the Bourdon tube construction is completed with a result in material savings of on the order of about 30–45%. Needless to say, material savings on this order of magnitude afford a signficant cost advantage to the gauge manufacturer in the price conscious markets in which such gauges are sold.

It is therefore an object of the invention to provide a novel Bourdon tube construction utilizing significantly less material as compared to similar purpose Bourdon tube constructions of the prior art.

It is a further object of the invention to effect the previous object with a novel method of manufacture therefor.

Figure 1:
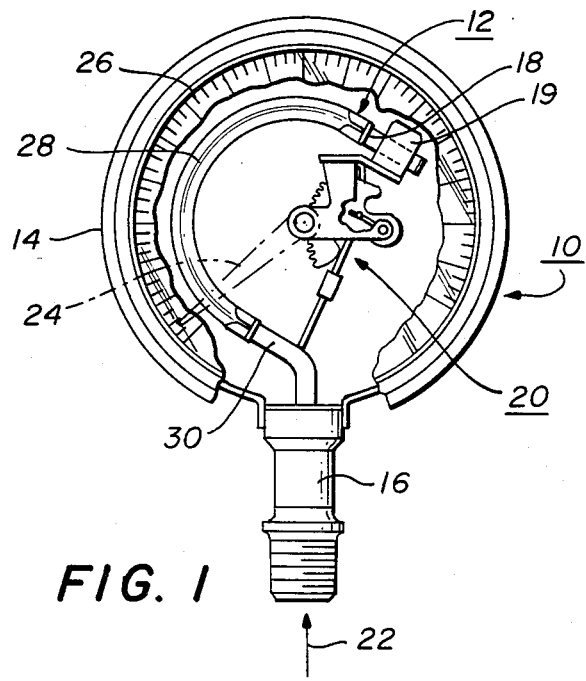
FIG. 1 is a front elevation partially sectioned of a pressure gauge exemplifying use of a Bourdon tube in accordance herewith.
Figure 5:
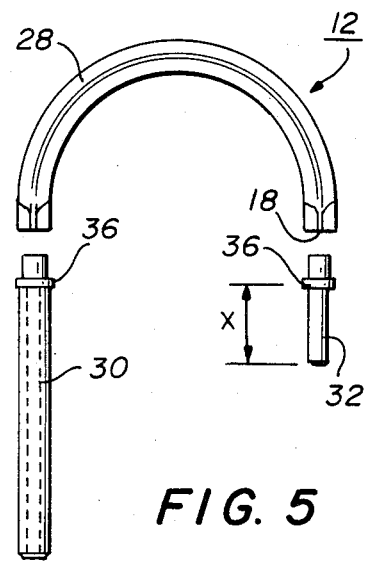
FIG. 5 is an exploded view of the unassembled Bourdon tube of FIG. 2.
Figure 2:
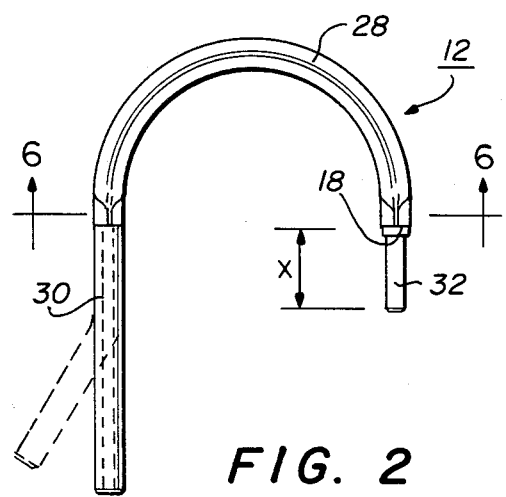
FIG. 2 is an enlarged elevation of the Bourdon tube of FIG. 1.
Figure 3:
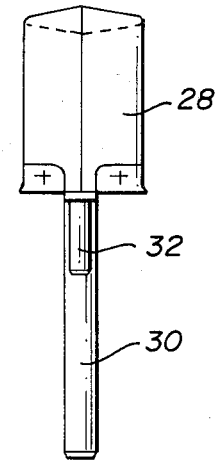
FIG. 3 is a side elevation of FIG. 2.

Referring first to FIG. 1, there is illustrated a pressure gauge designated 10 exemplifying use of a Bourdon tube 12 in accordance herewith to be described. Forming the gauge instrument is a generally annular casing 14 secured about a tubular socket 16 to which Bourdon tube 12 is secured as by welding. Mounted on the displacement end 18 of the Bourdon tube via a clamp 19 is an amplifier 20 which may be of a type disclosed in U.S. Pat. No. 4,240,298.

The gauge operates in a well known manner such that pressure or vacuum supplied to socket 16, as represented by arrow 22, is transmitted internally of Bourdon tube 12 causing free end 18 to wind and unwind in correlated response to the changing values of supply pressure. Displacement of free end 18 is translated through amplifier 20 to displace pointer 24 until the latter is opposite dial registration 26 corresponding to the value of pressure being supplied.

Referring also to FIGS. 2-6, the Bourdon tube hereof is formed of three separate components comprising the arcuate, semi-circular, duct-like displacement portion 28 having opposite, controlled sized openings 38 and 40 in the end edges thereof; the relatively non-displacement capillary 30; and a plug 32 of length X suitable for amplifier clamp 19 to be secured thereon.

Figure 4:
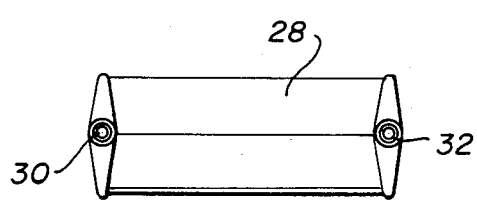
FIG. 4 is a bottom view of FIG. 2.
Figure 6:
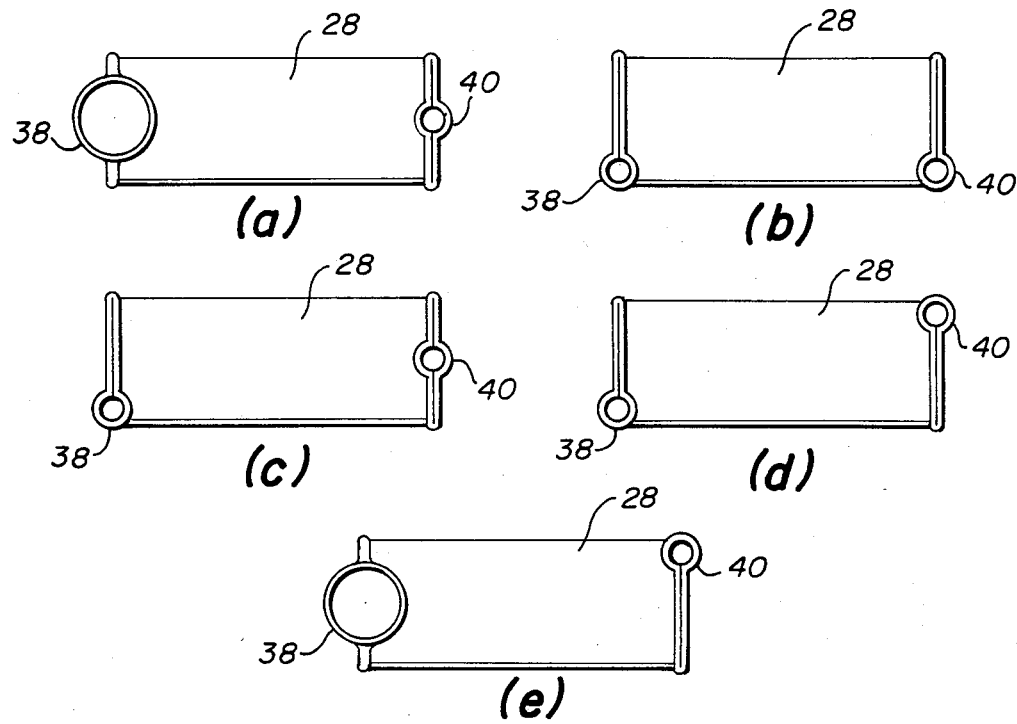
FIGS. 6(a) through (e) are alternative end constructions as viewed substantially along the lines 6—6 of FIG. 2.
Figure 7:
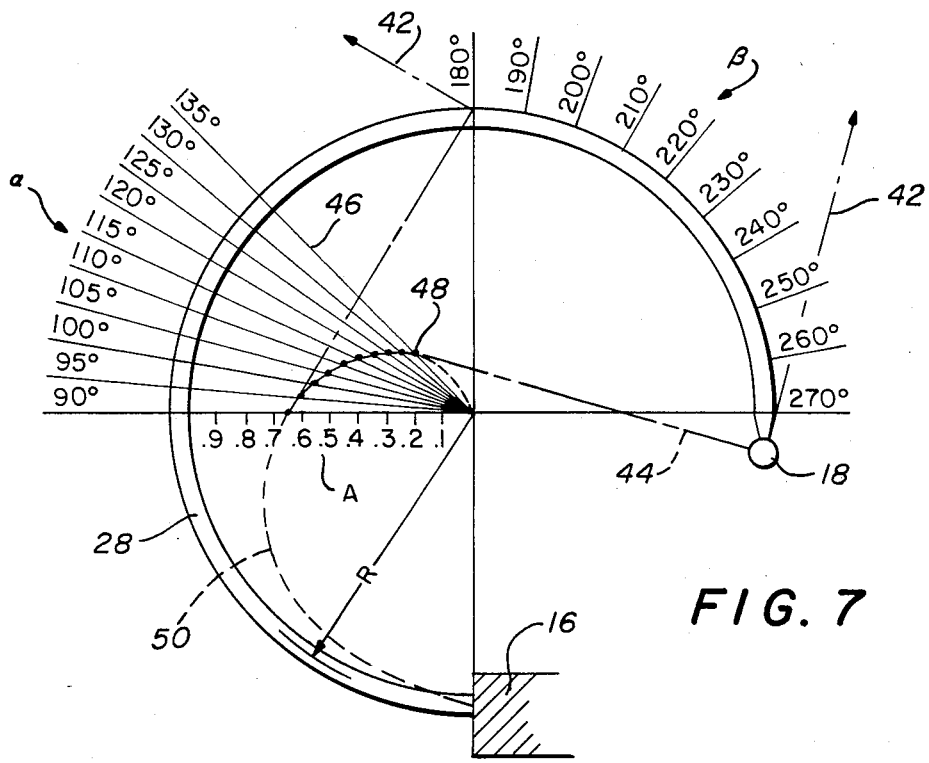
FIG. 7 is a typical polar point diagram for a Bourdon tube.

Each of capillary 30 and plug 32 include an annular shoulder 36 near their upper ends, as viewed on the drawings, to provide a penetration stop when inserted in a snug fit within openings 38 and 40, respectively. The openings can be relatively located and sized as shown in FIG. 4 or as shown in one of the alternative